US012587321B2

(12) United States Patent
Panteleev et al.

(10) Patent No.: US 12,587,321 B2
(45) Date of Patent: Mar. 24, 2026

(54) UE CONFIGURED FOR ENHANCED TYPE 3 HARQ-ACK CODEBOOK TRIGGERING BY DCI FORMAT

(71) Applicant: Intel Corporation, Santa Clara, CA (US)

(72) Inventors: Sergey Panteleev, Maynooth (IE); Debdeep Chatterjee, San Jose, CA (US); Fatemeh Hamidi-Sepehr, San Jose, CA (US); Toufiqul Islam, Santa Clara, CA (US); Salvatore Talarico, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 18/282,683

(22) PCT Filed: May 10, 2022

(86) PCT No.: PCT/US2022/028590
§ 371 (c)(1),
(2) Date: Sep. 18, 2023

(87) PCT Pub. No.: WO2022/240873
PCT Pub. Date: Nov. 17, 2022

(65) Prior Publication Data
US 2024/0154731 A1 May 9, 2024

Related U.S. Application Data

(60) Provisional application No. 63/187,324, filed on May 11, 2021.

(51) Int. Cl.
*H04L 1/1829* (2023.01)
*H04L 1/1822* (2023.01)

(52) U.S. Cl.
CPC .......... *H04L 1/1861* (2013.01); *H04L 1/1822* (2013.01)

(58) Field of Classification Search
CPC ... H04L 1/1861; H04L 1/1822; H04L 1/1864; H04L 5/0055; H04L 5/0098; H04W 72/23
See application file for complete search history.

(56) References Cited

U.S. PATENT DOCUMENTS

2021/0105102 A1 4/2021 Li et al.
2022/0060288 A1* 2/2022 Sun ........................ H04W 72/23
(Continued)

FOREIGN PATENT DOCUMENTS

JP 2023506092 2/2023
JP 2023536136 8/2023
(Continued)

OTHER PUBLICATIONS

"International Application Serial No. PCT/US2022/028590, International Search Report mailed Aug. 22, 2022", 3 pgs.
(Continued)

*Primary Examiner* — Edan Orgad
*Assistant Examiner* — Malick A Sohrab
(74) *Attorney, Agent, or Firm* — Schwegman Lundberg & Woessner, P.A.

(57) ABSTRACT

An apparatus and system are described to provide enhanced Type-3 HARQ-ACK codebook transmission are described. A gNB configures a UE for hybrid automatic repeat request (HARQ)-acknowledgment (ACK) (HARQ-ACK) retransmission using the enhanced Type-3 codebook using radio resource control signaling. The enhanced Type-3 codebook is triggered by downlink control information (DCI) format 1_1 or 1_2 and transmitted using a physical uplink control channel (PUCCH) or a physical uplink shared channel (PUSCH). Information in the DCI includes: whether to use
(Continued)

configured, activated, or indicated carriers, cell indexes for the carriers, whether to use all HARQ processes, use only semi-persistent scheduling (SPS) processes, or use only non-SPS processes, whether to use all priority HARQ processes, use only high priority HARQ processes, or use only low priority HARQ processes, and HARQ process range.

19 Claims, 5 Drawing Sheets

(56) References Cited

U.S. PATENT DOCUMENTS

| | | | | |
|---|---|---|---|---|
| 2022/0109529 | A1* | 4/2022 | Ye | H04W 52/50 |
| 2022/0116153 | A1* | 4/2022 | Hosseini | H04L 5/0053 |
| 2023/0057476 | A1* | 2/2023 | Li | H04L 1/1864 |
| 2023/0072973 | A1* | 3/2023 | Lee | H04L 1/1864 |
| 2023/0179342 | A1* | 6/2023 | Zhang | H04W 72/232 |
| | | | | 370/329 |
| 2023/0276456 | A1* | 8/2023 | Lin | H04L 1/1896 |
| | | | | 370/329 |
| 2023/0291508 | A1* | 9/2023 | Blankenship | H04L 1/1854 |
| 2023/0337233 | A1* | 10/2023 | Zhou | H04L 5/0055 |
| 2024/0031076 | A1* | 1/2024 | Cao | H04L 1/1896 |
| 2024/0032031 | A1* | 1/2024 | Yi | H04W 72/1273 |
| 2024/0072975 | A1* | 2/2024 | Rastegardoost | H04W 72/20 |

FOREIGN PATENT DOCUMENTS

| | | |
|---|---|---|
| JP | 2024515931 | 4/2024 |
| WO | WO-2022240873 A1 | 11/2022 |
| WO | 2023112287 | 6/2023 |

OTHER PUBLICATIONS

"International Application Serial No. PCT/US2022/028590, Written Opinion mailed Aug. 22, 2022", 4 pgs.

Intel Corporation, "Further details on UE HARQ feedback enhancements", R1-2103027, 3GPP TSG RAN WG1 Meeting, (Apr. 7, 2021), 13 pgs.

Nokia, et al., "HARQ-ACK Feedback Enhancements for URLLC/IIoT", R1-2102819, 3GPP TSG RAN WG1 Meeting #104-e-bis, e-Meeting, (Apr. 6, 2021), 20 pgs.

Qualcomm Incorporated, et al., "HARQ-ACK enhancement for IOT and URLLC", R1-2103163, 3GPP TSG RAN WG1 Meeting, (Apr. 7, 2021), 23 pgs.

Zte, "Discussion on HARQ-ACK enhancements for eURLLC", R1-2102493, 3GPP TSG RAN WG1 Meeting, (Apr. 7, 2021), 22 pgs.

"Japanese Application Serial No. 2023-554904, Notification of Reasons for Refusal mailed Apr. 22, 2025", W English Translation, 12 pgs.

"List of agreements of Rel-17 URLLC IIoT WI (post RAN1#107-e)", 3GPP TSG-RAN WG1 Meeting #107-e R1-2112761, Online]. Retrieved from the Internet: URL:https: www. 3gpp.org ftp tsg_ran WGI_RLI TSGRI_107-e Docs RI-2112761.zip, (Nov. 11, 2021), 62 pgs.

"International Application Serial No. PCT US2022 028590, International Preliminary Report on Patentability mailed Nov. 23, 2023", 6 pgs.

"U.S. Appl. No. 18/282,683, Supplemental Preliminary Amendment filed Dec. 14, 2023".

"U.S. Appl. No. 18/282,683, Preliminary Amendment filed Sep. 18, 2023".

"Japanese Application Serial No. 2023-554904, Notification of Reasons for Refusal mailed Nov. 5, 2024", w English translation, 8 pgs.

"Japanese Application Serial No. 2023-554904, Response filed Jan. 9, 2025 to Notification of Reasons for Refusal mailed Nov. 5, 2024", w current English claims, 16 pgs.

Apple Inc, "Views on URLLC HARQ feedback enhancements", R1-2103103 3GPP TSG RAN WG1#104b-e, (Apr. 7, 2021).

"Japanese Application Serial No. 2023-554904, Response filed Jul. 18, 2025 to Notification of Reasons for Refusal mailed Apr. 22, 2025", w English claims, 20 pgs.

* cited by examiner

UE CONFIGURED FOR ENHANCED TYPE 3 HARQ-ACK CODEBOOK TRIGGERING BY DCI FORMAT

PRIORITY CLAIM

This application is a U.S. National Stage Filing under 35 U.S.C. 371 from International Application No. PCT/US2022/028590, filed May 10, 2022 and published in English as WO 2022/240873 on Nov. 17, 2022, which claims the benefit of priority to U.S. Provisional Patent Application Ser. No. 63/187,324, filed May 11, 2021, each of which is incorporated herein by reference in its entirety.

TECHNICAL FIELD

Embodiments pertain to next generation wireless communications. In particular, some embodiments relate to retransmission of Hybrid Automatic Repeat Request (HARQ) feedback.

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
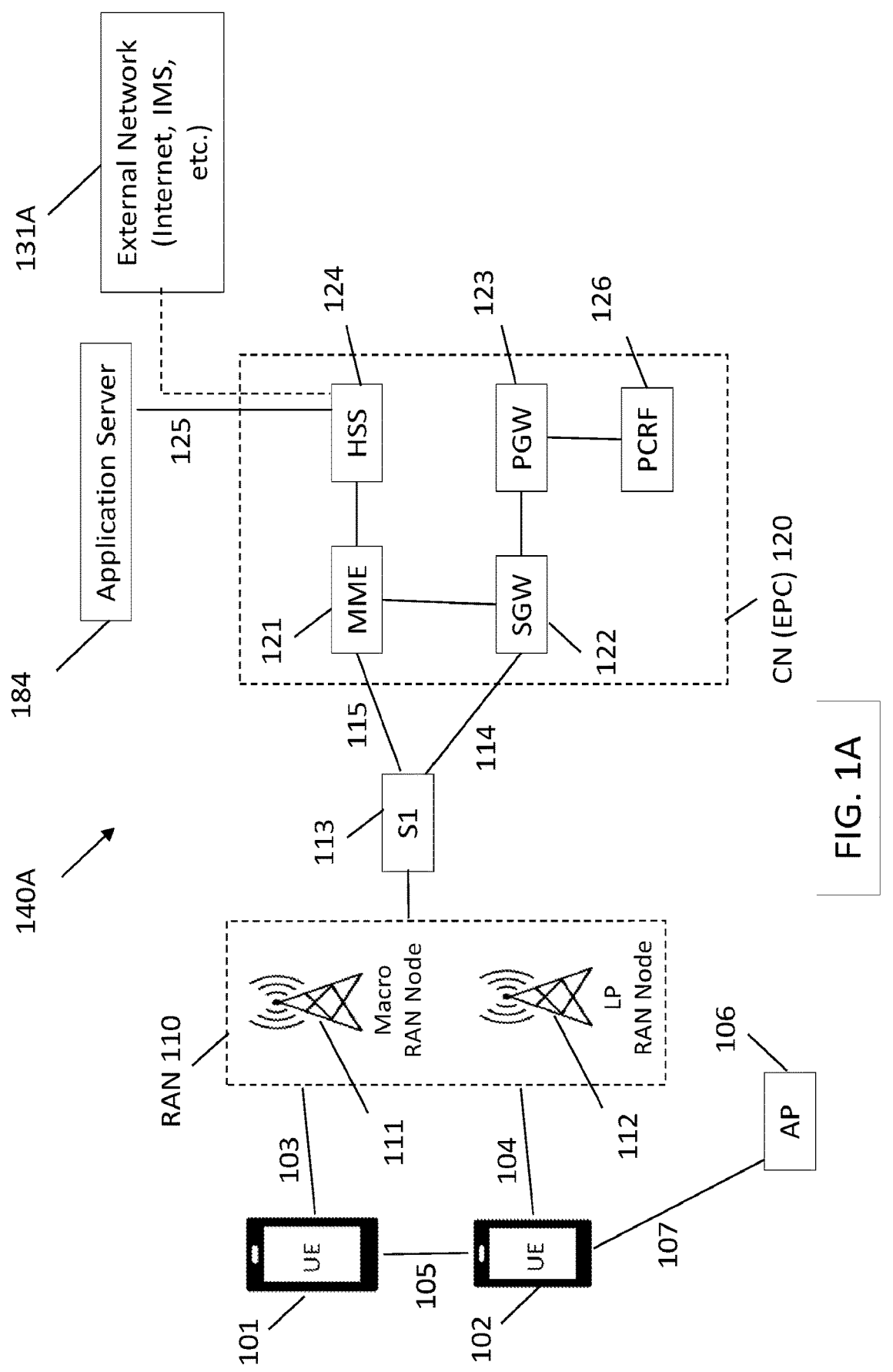
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as 6$^{th}$ generation NodeBs—and thus is more generally referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU–CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS)

Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
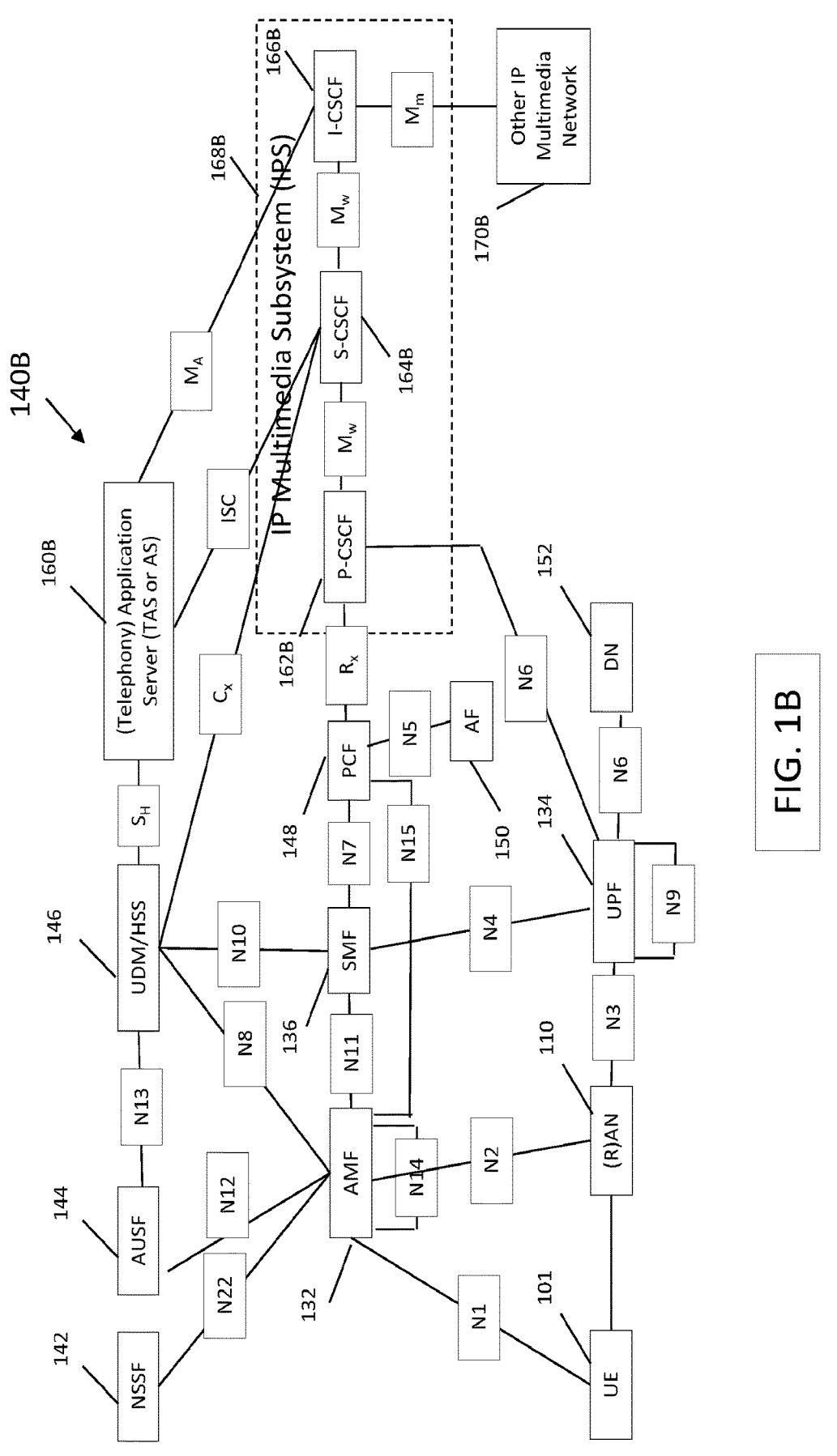
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
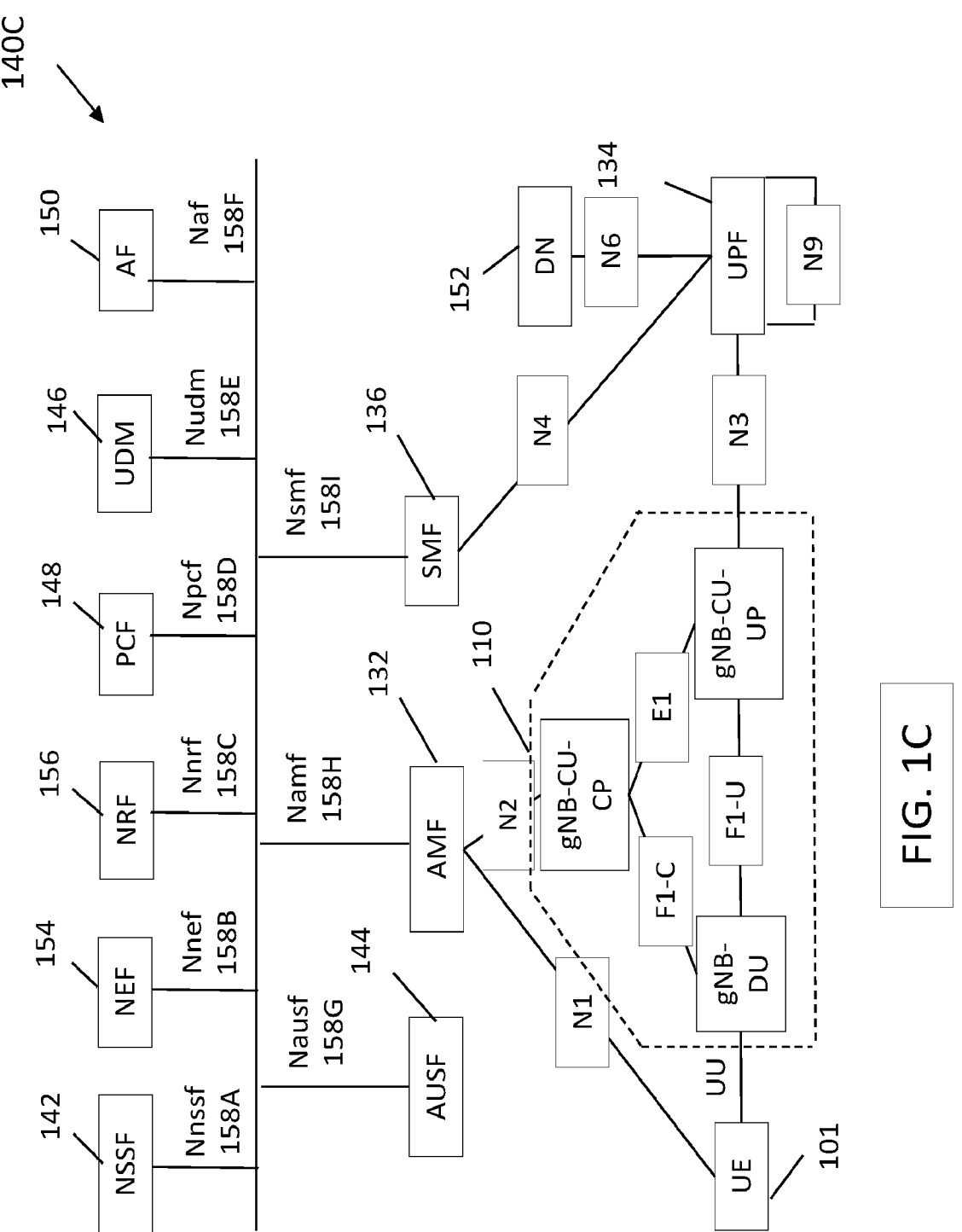
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
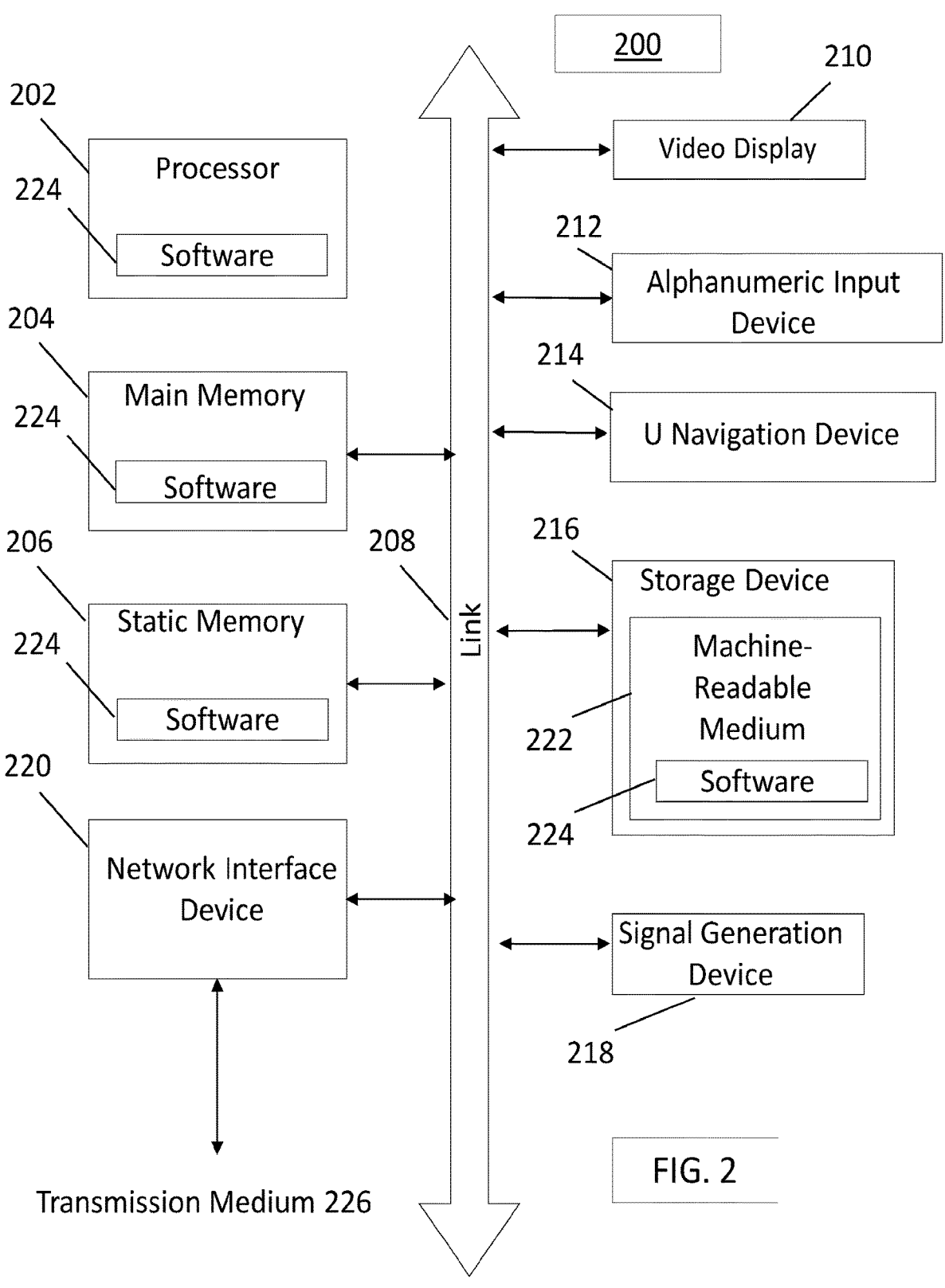
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, with the advent of NR, the achievable latency and reliability performance of the NR system have been extended from the 4G system to support use cases with tighter requirements. In order to extend the NR applicability in various verticals, Rel-16 NR evolved to support use cases including the Release 15 enabled use case improvements include augmented reality/virtual reality (AR/VR) and Release 16 use cases with higher requirements include factory automation, transport industry uses, and electrical power distribution. In Rel. 17, the NR technology is to be enhanced to support Ultra-Reliable Low Latency Communication (URLLC) and Industrial Internet-of-Things (IIoT) has started. One of the objectives is to enhance HARQ feedback from a UE.

Figure 3:
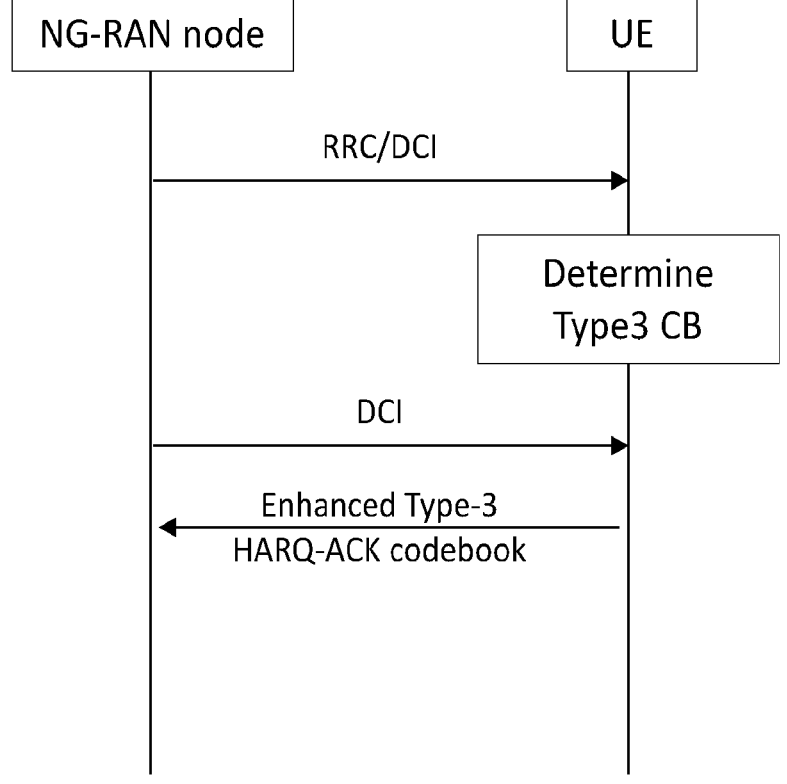
FIG. 3 illustrates a HARQ retransmission process in accordance with some embodiments.

For example, Rel-17 enhancements are desired to configure the system to avoid acknowledgment of semi-persistent scheduling (SPS) physical downlink shared channel transmission (SPS HARQ ACK) dropping for time-domain duplexing (TDD) systems due to PUCCH collision with at least one downlink (DL) or flexible symbol. Additional enhancements include SPS HARQ skipping for 'skipped' SPS physical downlink shared channel (PDSCH) transmissions, PUCCH repetition enhancements (at least for HARQ-ACK), e.g., sub-slot based, retransmission of cancelled HARQ transmissions, SPS HARQ payload size reduction and/or skipping for 'non-skipped' SPS PDSCH transmissions, type 1 HARQ codebook implementation based on a sub-slot PUCCH configuration, and PUCCH carrier switching for HARQ feedback. Accordingly, determining whether a deferral condition for a potential PUCCH (also referred to herein as a hypothetical PUCCH) has occurred, and SPS configuration order handling for deferral are described herein. FIG. 3 illustrates a HARQ retransmission process in accordance with some embodiments.

One of the issues identified for Rel. 17 is retransmission of dropped or cancelled HARQ feedback, that may occur due to a number of issues. One of these issues is the inability to map uplink control information (UCI) with a HARQ ACK on available uplink symbols due to collision with semi-static or dynamic DL, signaling system block (SSB), or Control resource set zero (CORESET #0) symbols. In addition, overlap with a higher priority UL channel may result in a dropped or cancelled HARQ feedback retransmission when multiplexing is not enabled. Also, the gNB may cancel the HARQ feedback retransmission using a UL cancellation indication or other mechanism.

Among retransmission HARQ feedback mechanisms, a potentially enhanced Type-3 HARQ codebook mechanism (for one shot feedback) or other mechanism, e.g., scheduling retransmission of a dropped feedback by a DL assignment or UL grant, may be used. To this end, an enhanced Type-3 codebook (CB) indication and enhanced Type-3 CB construction based on consideration of activated cells, SPS processes, priorities, and others are described herein.

Enhanced Type-3 HARQ-ACK Codebook

It is assumed that the Type-3 HARQ-ACK codebook design for 5G New Radio Unlicensed (NR-U) to handle the impact from listen-before-talk (LBT) failures can be re-used for retransmission of HARQ-ACK feedback in licensed spectrum operation. Currently, Type-3 CB operation can be enabled by a pdsch-HARQ-ACK-OneShotFeedback radio resource control (RRC) message. In this case, DCI format 1_1 also carries a 1-bit field "One-shot HARQ-ACK request". If pdsch-HARQ-ACK-OneShotFeedback is not provided, then this field is set to a value of "0". Once a DCI format 1_1 with "One-shot HARQ-ACK request" set to a value of '1' is received, the UE constructs a Type-3 CB using the following parameters:

$N_{cells}^{DL}$—the number of configured serving cells $N_{HARQ,c}^{DL}$—the value of nrofHARQ-Processes-ForPDSCH for serving cell c, if provided; else, set $N_{HARQ,c}^{DL}=8$ $N_{TB,c}^{DL}$—the value of maxNrofCodeWordsScheduledByDCI for serving cell c if harq-ACK-Spatial-BundlingPUCCH is provided and $NDI_{HARQ}=0$, or if harq-ACK-SpatialBundlingPUCCH is not provided, or if maxCodeBlockGroupsPerTransportBlock is provided for serving cell c; else, set $N_{TB,c}^{DL}=1$ $N_{HARQ-ACK,c}^{CBG/TB,max}$—the number of HARQ-ACK information bits per TB for PDSCH receptions on serving cell c if maxCodeBlockGroupsPerTransportBlock is provided for serving cell c and pdsch-HARQ-ACK-OneShotFeedbackCBG is provided; else, set $N_{HARQ-ACK,c}^{CBG/TB,max}=0$ $NDI_{HARQ}=0$ if pdsch-HARQ-ACK-OneShotFeedbackNDI is provided; else set $NDI_{HARQ}=1$ If a UE detects a DCI format that includes a one-shot HARQ-ACK request field with value 1, and the CRC of the DCI is scrambled by a cell radio network temporary identifier (C-RNTI) or a modulation and coding scheme C-RNTI (MCS-C-RNTI) (a UE identification used for indicating an alternative MCS table for PDSCH and PUSCH), and: resourceAllocation=resourceAllocationType0 and all bits of the frequency domain resource assignment field in the DCI format are equal to 0, resourceAllocation= resourceAllocationType1 and all bits of the frequency domain resource assignment field in the DCI format are equal to 1, or resourceAllocation=dynamicSwitch and all bits of the frequency domain resource assignment field in the DCI format are equal to 0 or 1, then a Type-3 CB is triggered by a DCI format not scheduling a PDSCH. Otherwise, if a UE detects a DCI format that includes a one-shot HARQ-ACK request field with value 1, and the cyclic redundancy code (CRC) of the DCI is scrambled by a C-RNTI or an MCS-C-RNTI, the Type-3 CB is triggered by a DCI scheduling a PDSCH.

15
16

Differentiating Type-3 CB (Type3CB) and Enhanced Type-3 CB (eType3CB)

In one embodiment, a UE may be provided as part of PhysicalCellGroupConfig information element (IE) with an optional RRC message with an exemplary name type 3CBType of enumerated type with possible value 'enhanced'. If the value is provided and set to 'enhanced' and if pdsch-HARQ-ACK-OneShotFeedback is also provided in the PhysicalCellGroupConfig 1E, then the Type-3 CB operation follows the enhanced version specified in Release 17 and onwards. Otherwise, if pdsch-HARQ-ACK-OneShotFeedback is not provided in the PhysicalCellGroup-Config 1E, the Type-3 CB operation follows the Release 16 version.

In one embodiment, a UE may be provided with dynamic switching flag in DCI format 1_1 and/or 1_2, which indicates whether Release 16 or Release 17 Type3CB, Type3CB, or eType3CB, is used.

Handling of Activated Cells

In one embodiment, a UE may be provided with an optional RRC field as part of the PhysicalCellGroupConfig 1E indicating whether the eType3CB construction uses all configured cells or all activated cells, or a subset of activated cells as basis for CB construction. In one example, the RRC field may have a single value which, if the RRC field is present, indicates the $N_{cells}^{DL}$ parameter in the Type-3 CB construction procedure is equal to the number of all activated DL cells. Otherwise, the $N_{cells}^{DL}$ parameter in the Type-3 CB construction procedure is equal to the number of all configured DL cells.

In another example, the RRC field may have two possible values. If the RRC field is present and set to the first value, the $N_{cells}^{DL}$ parameter in the Type-3 CB construction procedure is equal to the number of all activated DL cells. If the RRC field is present and set to the second value, the $N_{cells}^{DL}$ parameter in the Type-3 CB construction procedure is equal to one corresponding to DL cell indicated in the DCI format 1_1/1_2 triggering the eType3CB. Otherwise, the $N_{cells}^{DL}$ parameter in the Type-3 CB construction procedure is equal to the number of all configured DL cells.

Handling of Priority

In one embodiment, if a UE is provided with DCI format 1_1 or 1_2 with a priority field present and triggering an eType3CB HARQ codebook, the eType3CB may be constructed from a subset of HARQ processes that correspond to a subset or all priorities.

In one option, if a UE is provided with DCI format 1_1 or 1_2 with a priority field present and the DCI format does not schedule a PDSCH, the priority field may be used as follows for CB constructions: if the priority field is set to '1', only HARQ processes triggered by DCI or corresponding to an SPS configuration with priority '1' are multiplexed in eType3CB; if the priority field is set to '0', only HARQ processes triggered by DCI or corresponding to an SPS configuration with priority '0' are multiplexed in eType3CB.

Alternatively, if the priority field is set to '1', only HARQ processes triggered by DCI or corresponding to an SPS configuration with priority '1' are multiplexed in eType3CB. In this case, if the priority field is set to '0', all HARQ processes triggered by DCI or corresponding to an SPS configuration with priority '0' or '1' are multiplexed in eType3CB.

The CB construction may be configurable through RRC or using dynamic DCI whether the value '0' indicates multiplexing of HARQ feedback corresponding to priority '0' only or to both '0' and '1'.

Related to the above options, the existing priority field may not be utilized, but the other unused fields in DCI such as MCS, time-domain resource allocation (TDRA), HARQ process ID, New Data Indicator (NDI), or priority etc., can be re-interpreted to indicate 1-bit or more than one bit information. The information can be used to switch between the CB construction options, as discussed above, e.g., whether to only multiplex HARQ-ACK bits related to priority '1' or priority '0' or both '1' and '0'.

| Payload of the field(s) indicating priority-based eType3CB construction | Priority consideration |
|---|---|
| 00 | LP only |
| 01 | HP only |
| 10 | HP and LP |
| 11 | reserved |

Since the number of low priority (LP) and high priority (HP) processes is dynamic and depends on actual scheduling situation, two options are possible. Option 1: Priority-based eType3CB is constructed based on the actual number of HARQ processes received for a given priority or a combination of priorities. In this option, there is a possibility of CB size ambiguity between the gNB and UE due to missed DCIs. Option 2: Priority-based eType3CB is constructed based on the nominal number of HARQ processes. The nominal number of HARQ processes for a priority may be configured by RRC signaling or a combination of RRC signaling and DCI.

In one option, if a UE is provided with DCI format 1_1 or 1_2 with a priority field present and the DCI format schedules a PDSCH, the priority field may not be used for eType3CB construction, since the priority is also associated with the scheduled PDSCH. Instead, regardless of whether the priority field is set to '1' or '0', all HARQ processes triggered by DCI or corresponding to an SPS configuration with priority '0' or '1' are multiplexed in eType3CB. Alternatively, the same handling as for a DCI not scheduling a PDSCH as described above may be applied.

In some embodiments, the DCI may indicate whether the codebook is to multiplex high and/or low priority information irrespective of whether the PDCCH schedules a PDSCH.

For example, the CB construction (mapping of HARQ-IDs to bits in the HARQ-ACK CB) may be determined based on the nominal number of HARQ processes; the indicated priority determines that only those bits corresponding to the indicated priority for HARQ-ACK feedback convey information.

Handling of SPS HARQ Processes

Another option for Type-3 CB size optimization is to consider SPS-only processes for eType3CB construction, in order to handle the typical case of SPS HARQ-ACK dropping.

In one embodiment, a UE may be provided with an optional RRC message indicating that eType3CB construction uses SPS HARQ processes only. In this case, $N_{HARQ,c}^{DL}$ may be calculated as the maximum possible HARQ process ID from the configured plurality of maximum number of SPS HARQ processes (nrofHARQ-Processes) and the HARQ processes ID offsets (harq-ProcID-Offset) among the activated or configured SPS configurations. Alternatively, a UE may be provided with a separate maximum number of HARQ processes for eType3CB construction.

In one embodiment, when DCI format 1_1 or 1_2 triggers eType3CB and does not schedule a PDSCH, the unused fields in the DCI format (e.g., MCS, HARQ ID, TDRA) can be re-interpreted to indicate by X least significant bit (LSB) or most significant bit (MSB) whether the eType3CB is constructed using only SPS HARQ processes, only dynamic HARQ processes, or both SPS and dynamic HARQ processes.

In one embodiment, when DCI format 1_1 or 1_2 triggers eType3CB and schedules a PDSCH, the eType3CB is constructed for only one combination of HARQ processes: SPS only, dynamic only, or SPS and dynamic, since there is no unused field that can be re-interpreted and utilized for dynamic switching.

Generalized Dynamic Switching Between eType3CB Construction Configurations

There are different attributes that may be an input to the adaptation of eType3CB size: activated cells, SPS vs non-SPS processes, priority, etc. Each of these attributes may use dynamic indication in the DCI. A generalized mechanism of eType3CB construction based on dynamic indication may be introduced as follows:

The RRC configuration may provide a table (RRC table M) that provides mapping of a DCI field payload to a combination of attributes used for eType3CB construction. The size of the RRC table M may be flexible and may be up to gNB implementation, from 1 (e.g., no dynamic configurability of eType3CB) to some maximum value predefined in specification (e.g., 4 or 8 or 16 or any other natural value). Each row of the table contains a structure with fields indicating the parameters of eType3CB construction. Each entry may be one or a combination of the following: Carriers: {configured, activated, indicated}, Carrier: cell indexes, SPS: {all, SPS, non-SPS}, Priority: {all, HP, LP}, Nominal # of processes for priority: integer number, HARQ processes range: start process ID—end process ID.

An example table is provided below:

| DCI index | Carriers: {configured, activated, indicated } | SPS: {all, SPS, non-SPS} | #HARQ bits for SPS: {1 ... 16} | Priority: {all, HP, LP} | HARQ process range {Start-end} |
|---|---|---|---|---|---|
| 0 | configured | all | 16 | all | 0-15 |
| 1 | activated | SPS | 8 | all | 0-8 |
| 2 | activated | all | 16 | HP | 1-9 |
| 3 | | | | | |

In the above example table, the first entry indicates that HARQ processes from all configures cells are used, that both dynamic and SPS processes are multiplexed, that 16 SPS processes are used, that all priorities are used, and that the range of HARQ processes IDs is from 0 to 15.

The generalized eType3CB indicator in the DCI of size log 2(M) may be encoded in DCI format 1_1 or 1_2 as follows:

In one option, the generalized eType3CB indicator is only present in the case that DCI format 1_1 or 1_2 does not schedule a PDSCH, and the unused DCI fields (e.g., MCS, HARQ ID, NDI, TDRA) are re-interpreted for that purpose. In the case that the DCI schedules PDSCH, the first entry of the RRC configured table is taken.

In another option, the generalized eType3CB indicator is present as a separate new field in DCI format 1_1 or 1_2 whenever the RRC table is provided.

Thus, in some embodiments, DCI format 1_1 or 1_2 may be used to trigger the eType3CB. A separate presence configuration and common HARQ CB set configuration may be used. A 1-bit "one-shot HARQ-ACK request" field may be used in the DCI to trigger the eType3CB. A CB type indication may be included in the DCI to indicate the specific CB type to use.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operation in a fifth-generation new radio (5G NR) network, the apparatus comprising:
   processing circuitry; and memory, wherein the processing circuitry is configured to:
   decode radio resource control (RRC) configuration information received from a gNodeB (gNB) to enable enhanced Type 3 HARQ-ACK codebook triggering by a downlink control information (DCI) format;
   decode the DCI format received from the gNB requesting a Type-3 HARQ-ACK codebook report;
   determine a PDSCH HARQ-ACK Enhanced Type 3 Index value from an enhanced Type 3 codebook indicator field in the DCI format when the DCI format schedules a physical downlink shared channel (PDSCH) reception;
   determine the PDSCH HARQ-ACK Enhanced Type 3 Index value from a value of a modulation and coding scheme (MCS) field of the DCI format when the DCI format does not schedule the PDSCH reception and when the DCI format does not include the enhanced Type 3 codebook indicator field;
   and determine the enhanced Type 3 HARQ-ACK codebook based on the PDSCH HARQ-ACK Enhanced Type 3 Index value for transmission to the gNB.

2. The apparatus of claim 1, wherein the DCI format is DCI format 1_2.

3. The apparatus of claim 2, wherein the processing circuitry is configured to decode a one-shot HARQ-ACK request bit in the DCI format 1_2 to determine if PDSCH HARQ-ACK One Shot Feedback for the DCI format 1_2 or PDSCH HARQ-ACK Enhanced Type 3 feedback for the DCI format 1_2 is configured,
   wherein when the PDSCH HARQ-ACK Enhanced Type 3 feedback for the DCI format 1_2 is configured, the Type-3 HARQ-ACK codebook report is requested.

4. The apparatus of claim 3, wherein a number of HARQ processes correspond to the PDSCH HARQ-ACK Enhanced Type 3 Index value and wherein each bit of the enhanced Type 3 HARQ-ACK codebook is provided per component carrier (CC) corresponding to a serving cell.

5. The apparatus of claim 4, wherein when the DCI format 1_2 schedules the PDSCH reception, the processing circuitry is configured to determine a set of downlink cells and a HARQ process number for the downlink cells to determine the enhanced Type 3 HARQ-ACK codebook.

6. The apparatus of claim 3, wherein the DCI format 1_2 includes one or more fields that trigger the enhanced Type 3 HARQ-ACK codebook.

7. The apparatus of claim 3, wherein the DCI format 1_2 includes one or more fields that trigger the enhanced Type 3 HARQ-ACK codebook when the DCI format 1_2 does not schedule the PDSCH reception.

8. The apparatus of claim 1, wherein the DCI format is DCI format 1_1.

9. The apparatus of claim 1, wherein the memory is configured to store the enhanced Type 3 HARQ-ACK codebook.

10. A non-transitory computer-readable storage medium that stores instructions for execution by processing circuitry of a user equipment (UE) configured for operation in a fifth-generation new radio (5G NR) network, the processing circuitry is configured to:
   decode radio resource control (RRC) configuration information received from a gNodeB (gNB) to enable enhanced Type 3 HARQ-ACK codebook triggering by a downlink control information (DCI) format;
   decode the DCI format received from the gNB requesting a Type-3 HARQ-ACK codebook report;
   determine a PDSCH HARQ-ACK Enhanced Type 3 Index value from an enhanced Type 3 codebook indicator field in the DCI format when the DCI format schedules a physical downlink shared channel (PDSCH) reception;
   determine the PDSCH HARQ-ACK Enhanced Type 3 Index value from a value of a modulation and coding scheme (MCS) field of the DCI format when the DCI format does not schedule the PDSCH reception and when the DCI format does not include the enhanced Type 3 codebook indicator field; and
   determine the enhanced Type 3 HARQ-ACK codebook based on the PDSCH HARQ-ACK Enhanced Type 3 Index value for transmission to the gNB.

11. The non-transitory computer-readable storage medium of claim 10, wherein the DCI format is DCI format 1_2.

12. The non-transitory computer-readable storage medium of claim 11, wherein the processing circuitry is configured to decode a one-shot HARQ-ACK request bit in the DCI format 1_2 to determine if PDSCH HARQ-ACK One Shot Feedback for the DCI format 1_2 or PDSCH HARQ-ACK Enhanced Type 3 feedback for the DCI format 1_2 is configured,
   wherein when the PDSCH HARQ-ACK Enhanced Type 3 feedback for the DCI format 1_2 is configured, the Type-3 HARQ-ACK codebook report is requested.

13. The non-transitory computer-readable storage medium of claim 12, wherein a number of HARQ processes correspond to the PDSCH HARQ-ACK Enhanced Type 3 Index value and wherein each bit of the enhanced Type 3 HARQ-ACK codebook is provided per component carrier (CC) corresponding to a serving cell.

14. The non-transitory computer-readable storage medium of claim 13, wherein when the DCI format 1_2 schedules the PDSCH reception, the processing circuitry is configured to determine a set of downlink cells and a HARQ process number for the downlink cells to determine the enhanced Type 3 HARQ-ACK codebook.

15. An apparatus for gNodeB (gNB) configured for operation in a fifth-generation new radio (5G NR) network, the apparatus comprising:
   processing circuitry; and memory, wherein the processing circuitry is configured to:
   encode radio resource control (RRC) configuration information for transmission to a user equipment (UE), the RRC configuration information to enable enhanced Type 3 HARQ-ACK codebook triggering by a downlink control information (DCI) format;
   encode the DCI format for transmission to the UE, the DCI format requesting a Type-3 HARQ-ACK codebook report;
   wherein the processing circuitry is configured to further encode the DCI format to include an enhanced Type 3 codebook indicator field for use by the UE in determining a PDSCH HARQ-ACK Enhanced Type 3 Index value when the DCI format schedules a physical downlink shared channel (PDSCH) reception;

wherein the processing circuitry is configured to further encode a modulation and coding scheme (MCS) field of the DCI format for use by the UE in determining the PDSCH HARQ-ACK Enhanced Type 3 Index value when the DCI format does not schedule the PDSCH reception and when the DCI format does not include the enhanced Type 3 codebook indicator field decode the enhanced Type 3 HARQ-ACK codebook generated by the UE based on the PDSCH HARQ-ACK Enhanced Type 3 Index value, the enhanced Type 3 HARQ-ACK codebook received from the UE.

16. The apparatus of claim 15, wherein the DCI format is DCI format 1_2.

17. The apparatus of claim 16, wherein the processing circuitry is configured to include a one-shot HARQ-ACK request bit in the DCI format 1_2 to indicate to the UE if PDSCH HARQ-ACK One Shot Feedback for the DCI format 1_2 or PDSCH HARQ-ACK Enhanced Type 3 feedback for the DCI format 1_2 is configured, wherein when the PDSCH HARQ-ACK Enhanced Type 3 feedback for the DCI format 1_2 is configured, the Type-3 HARQ-ACK codebook report is requested.

18. The apparatus of claim 17, wherein a number of HARQ processes correspond to the PDSCH HARQ-ACK Enhanced Type 3 Index value and wherein each bit of the enhanced Type 3 HARQ-ACK codebook is per component carrier (CC) corresponding to a serving cell.

19. The apparatus of claim 18, wherein when the DCI format 1_2 schedules the PDSCH reception, the enhanced Type 3 HARQ-ACK codebook is to be determined by the UE for a set of downlink cells and a HARQ process number for the downlink cells.

\* \* \* \* \*